Feb. 5, 1946. H. L. KINDORF 2,394,518
UNIVERSAL MULTIPLE CABLE CLAMP
Filed Feb. 14, 1944 3 Sheets-Sheet 1
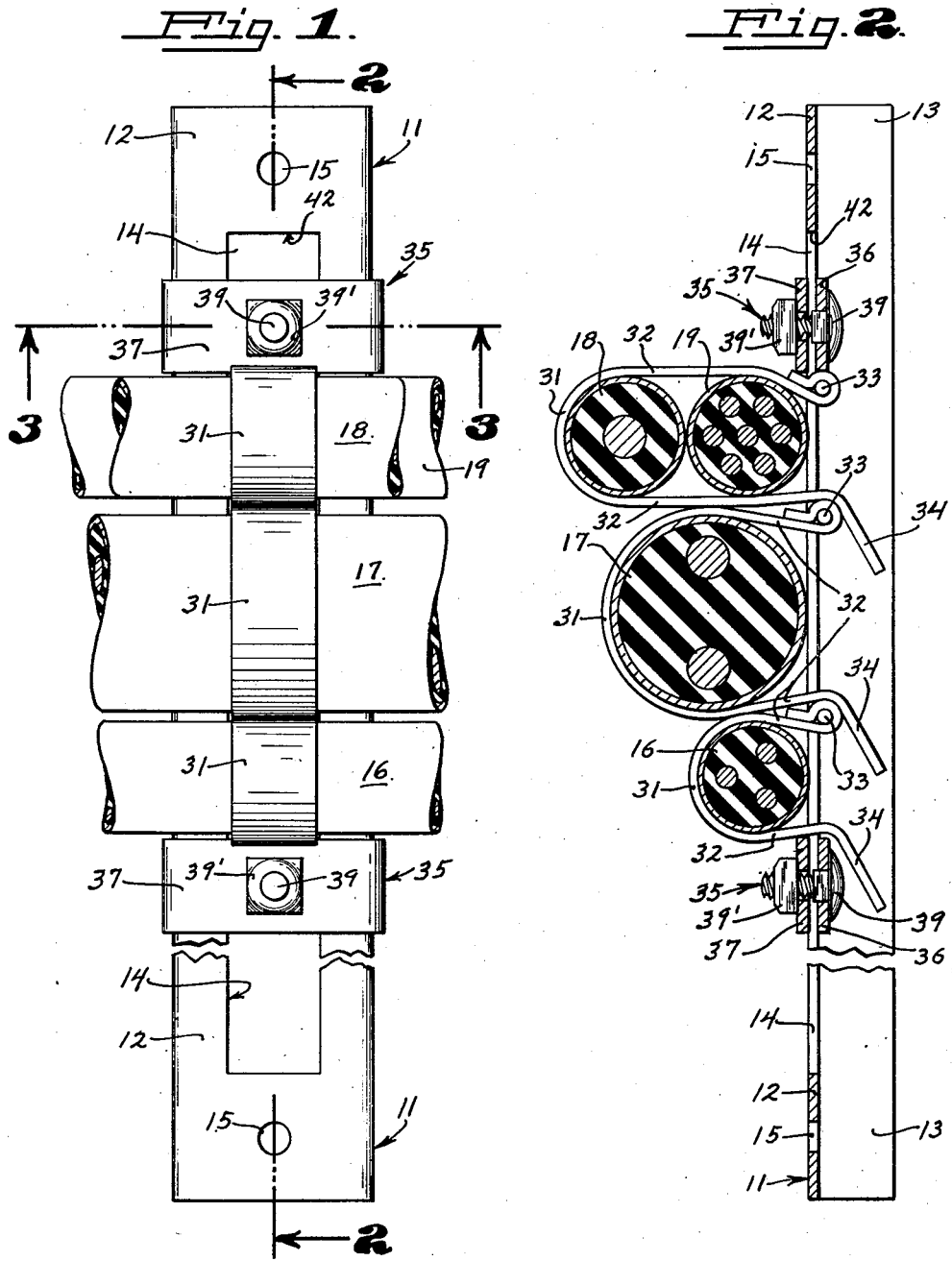
INVENTOR,
HARRY L. KINDORF.
BY Charles M. Fryer
ATTORNEY.

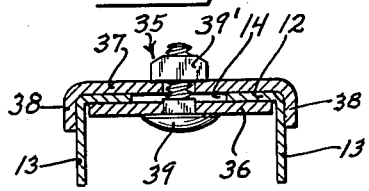
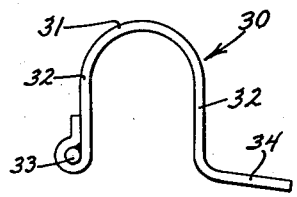
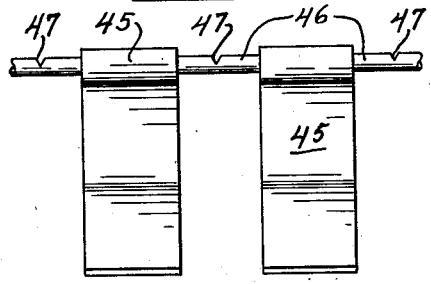
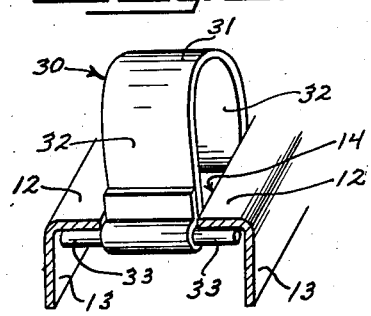
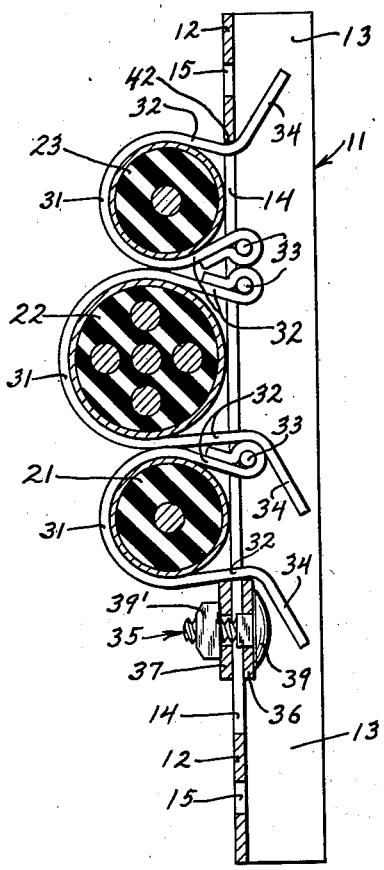

Feb. 5, 1946.  H. L. KINDORF  2,394,518
UNIVERSAL MULTIPLE CABLE CLAMP
Filed Feb. 14, 1944  3 Sheets-Sheet 3
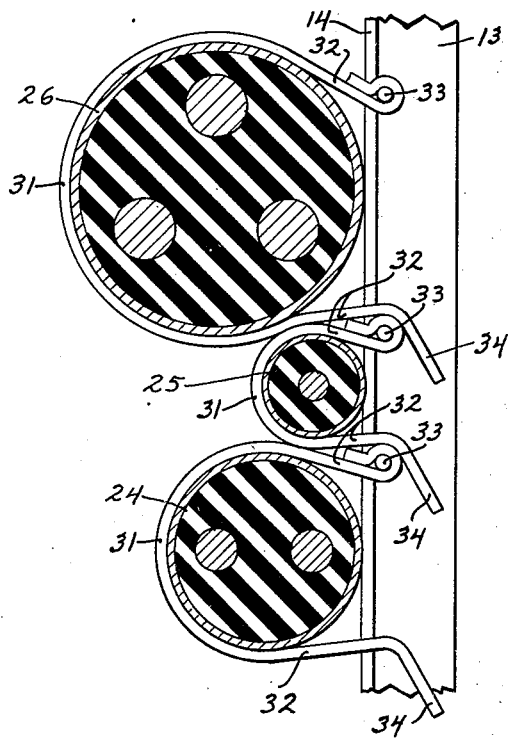
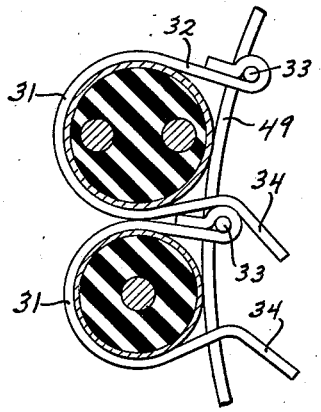
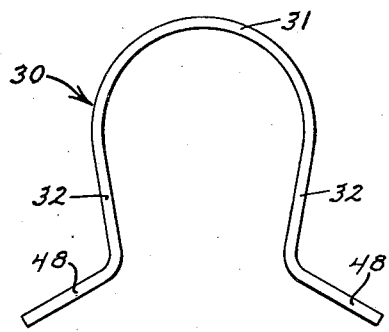
INVENTOR.
HARRY L. KINDORF.
BY Charles M. Fryer
ATTORNEY.

Patented Feb. 5, 1946

2,394,518

UNITED STATES PATENT OFFICE 2,394,518

UNIVERSAL MULTIPLE CABLE CLAMP

Harry L. Kindorf, San Francisco, Calif.

Application February 14, 1944, Serial No. 522,363

7 Claims. (Cl. 248—68)

This invention relates to clamps for fastening, supporting, and retaining cables, pipes, rods, and the like in fixed position.

Objects of the invention are to provide clamps for fastening in fixed position one or any number of cables of the same or varying sizes, which are simple in construction, easy and inexpensive to manufacture, easy to assemble with what is to be clamped thereby, and other objects will be apparent in reading this specification.

A preferred exemplification of the invention is illustrated on the accompanying drawings which form a part thereof, on which Fig. 1 is a plan view of a complete assembly;

Fig. 2 is a section thereof on the line 2—2 of Fig. 1;

Fig. 3 is a section on the line 3—3 of Fig. 1;

Fig. 4 is a cross section of the clamp showing a detail;

Fig. 5 is a view similar to Fig. 2 of a modified form of use of the invention;

Fig. 6 is a view similar to Figs. 2 and 5 showing a still different use;

Fig. 7 is a side elevation of the hook member;

Fig. 8 is a side elevation of a gang of hook members illustrating the manufacture thereof;

Fig. 9 is a side elevation of a different form of hook member; and

Fig. 10 is a view similar to Fig. 1 showing a modification.

The invention comprises a base member 11 consisting preferably of a steel channel bar having a web 12 and flanges 13. The web has a longitudinal slot 14 therein; as well as fastening means such as holes 15 to permit of fastening the base member to a wall or other suitable support as by bolts (not shown).

Cables of desired sizes are laid on the web crosswise of the base member in any desired manner, as for example the cables 16, 17, 18, 19, as seen on Figs. 1 and 2, the cables 21, 22, 23 on Fig. 5 and the cables 24, 25, 26 on Fig. 6. The cables are such as are required and they may be laid in any order with respect to size, side by side or over each other.

Binding members 30 as shown on Figs. 4 and 7, of suitable sizes and shapes, hold each individual cable or group of cables, as may be desired. The binding members 30 may all be similar in construction, having an arcuate portion 31, each to fit the respective individual cable or group, the arcuate portion having substantially straight legs 32 at the end of one of which is a transverse member 33, and at the end of the other is a hook member 34 which may be formed by bending. At least that part of each binding member comprising the hook part 34 is narrower than the slot 14 in the base member, so that it can be inserted easily therethrough; and the transverse member 33 is of a length to permit it to lie crosswise below the web 12 within the channel with the ends of the transverse member under and against the under face or inner side of the web, as seen on Fig. 4. By this arrangement, such binding member, after its transverse member 33 adjacent one end thereof is engaged against the inner side of the web or base 12, may be readily tilted longitudinally of the base so as to cause the intermediate portion thereof to be fitted around a cable to be clamped. Thus, the hook or bend part 34 at the end opposite to transverse member 33, provides a holding means adapted to be free of holding engagement with the base, permitting such tilting until it is subsequently held fast.

Retaining members 35 are provided to maintain the cables of each group 16, 17, 18 or 21, 22, 23 closely adjacent each other longitudinally of the base member as seen on Figs. 1, 2, 5, 6 and 10. Any suitable retaining means may be used, but that preferred comprises a bar 36 crosswise at the lower face of the web 12, and a bar 37, preferably having flanges 38 at the ends thereof, at the outer face of the web of the channel iron. Both the bars 36 and 37 have perforations registering with each other and with the slot 14, through which the shank of a bolt 39, preferably a carriage bolt, projects. A nut 39' is on such bolt, and when tightened fastens the retaining member 35 in place on the base member. The ends of the bar 36 may be square to retain the bar in proper crosswise position. The flanges 38 retain the bar 37 in proper crosswise position.

The base members are usually first fixed in position where desired, and then the cables are laid on a base member. The cables may be temporarily tied or wired to the base member, with each cable or pipe or each group 18, 19 thereof separated from the adjacent units sufficiently to permit of properly locating the binding members 30 for each unit. The binding members 30 are then put in place individually by turning them at right angles to the position shown for example on Fig. 4, passing the transverse member 33 through the slot 14, then turning the binding member and placing it in position over the unit as shown on Figs. 1, 2, 5, 6 and 10, with the hook members 34 passed through the slot 14 and below the web 12; or the temporary binding may be omitted. When all of the binding units 30 are thus in place, the temporary bindings are removed, if they are used, and the assembly is moved longitudinally of the base member 11 so that the units are as close as possible to each. The hook members 34 fit under the transverse members 33 or under a retaining member 35 or under an end wall 42 of the slot 14, and are held thereby. Such an end wall may be used in place of one of the retaining members in cases where the consequent loss in degree of adjustability offers no great disadvantage.

When the assembly of a clamp has been completed, the cables which are loose in the next clamp can be drawn taut therethrough, if necessary with block and tackle, and then fastened.

Crowding the units of the assembly together longitudinally of the clamp, as seen on Figs. 1, 2, 5, 6 and 10, which is conveniently done by tapping on the loose or partly loose retaining member 35 with a hammer or mallet, causes the binding members 30 each to be wrapped around the individual cables so that they contact the cables over their peripheries for more than one hundred eighty degrees (180°) which is an advantage, since the greater the contact surface, the more securely do the binding members hold the cables. This also tends to stretch the binding members 30 around the cables, which increases the security with which the cables are held. Either end of a binding member 30 may be adjacent the retaining member 35 or end wall 42 and the transverse member 33 of a binding member may be adjacent either end of the adjacent binding member, as seen on Figs. 2 and 5. It is usually desirable, however, not to have hook members 34 of adjacent binding members adjacent each other.

Where very large and very small cables are to be laid side by side, space may be saved by laying a small cable between two large cables as seen on Fig. 6. The base members are suitably fastened in position as previously referred to, and where desired, they may be welded or otherwise fastened to bulkheads. The flanges 13 of the base member may be omitted and then the base member may be curved as desired as seen at 49 on Fig. 10. Where only one cable is to be held in position, the binding member may have a hook member 48 at each end as shown on Fig. 9.

The binding members 30 preferably comprises a steel strap to form the arcuate portion 31, the legs 32, and the hook member 34, a stiff wire or rod forming the transverse member 33, with the strap bent preferably tightly around the rod as shown on Figs. 4 and 7. In the manufacture of such binding members, it is desirable to form a plurality of strap members 45 about a wire 46, and to deliver them in unitary groups with nicks 47 therein so that the individual binding members may be easily broken off as they are required.

The novel clamps can be used in any position and they can be grouped in any manner and they should be as closely adjacent to each other as conditions may require. On ships which may be subjected to shock or explosion, they are usually about 12 to 18 inches apart and thereby afford very strong support for any required number of cables and thereby lessen the possibility of short circuits even though one or more cables be broken. The invention permits of laying cables parallel to each other, and in groups located relatively to each other as may be desired, and permits of branching off of any of the parallel cables. Furthermore, the removal of any cable (or group) can easily be done by loosening the retaining member 35 and sliding it along the base member, which permits of loosening the gang of cables and removing the binding members of the desired cables and the cables themselves. After removal, the remaining cables are tightened and fastened again as previously described.

The invention permits of using lighter materials than heretofore because there is no tendency for any part to bend except the binding members 30, bending of which is an advantage as hereinbefore explained. Assembly of the cables can begin at either end and the clamp can be used upside down or in any other position; and when upside down, the binding members are self-retaining by reason of the transverse members which form a part thereof. The invention is applicable to standard sizes of cables or to any sizes that may be desired, since the binding members 30 can easily be made in any desired sizes. Whatever pressure is applied to the cables is applied not at one point, which may result in flattening or deformation of the cables, but such pressure is applied about the periphery thereof in such a manner as to avoid substantial deformation. The cables may be fixed in position by the present invention at a distance from walls or bulkheads to permit of cleaning and painting thereunder. The invention is useful for supporting cables, pipes, and the like, in almost any situation, and it may be used in any position or combination that may be required or found expedient.

It is within the spirit of this invention to make the binding members 30 of Figs. 7 and 9 with the hook members 34 and 48 projecting in the same direction as the legs 32 of which they form extensions, and to bend them to the shape shown on the drawings after the binding members have been assembled with the cable or like units and the base member. Other variations within the spirit of the invention are possible, and certain details have been referred to or illustrated for descriptive purposes only.

I claim:

1. A cable clamp comprising a base member having an elongated slot therein; and binding members having parts to surround cables and each having a part to project through said slot, said projecting parts being interlocking when compressed longitudinally of said slot.

2. A cable clamp comprising a base member having a slot therein, a binding member having a part to surround a cable and ends to project through said slot, one of said ends having a transverse member longer than the width of said slot and the other of said ends having a bend after assembly.

3. A cable clamp comprising a base member having a slot therein, a binding member comprising a strap portion having ends to project through said slot and an intermediate portion to surround a cable, one of said strap ends having a transverse member about which it is bent, the other of said ends being dimensioned to project under said base member and having a bend after assembly.

4. A cable clamp comprising a base member having a slot therein, binding members each having a part to surround a cable and parts to project through said slot to a position under said base member, projecting parts of adjacent binding members mutually retaining each other against withdrawal through such slot.

5. A cable clamp comprising a base member having a slot therein, binding members to surround cables with ends projecting through said slot, transverse members at one end of said binding members, hook members at the other end of said binding members and an adjustable retaining means comprising bars on each side of said base member and a member projecting through said bars and said slot to retain it in position on said base member.

6. A binding device for a cable or the like clamp comprising a binding member having end parts, and an intermediate part adapted to embrace a cable and hold it against a base provided with a slot, one of such end parts having a pin member extending transversely of the binding member from each side edge thereof to provide a portion wider than the width of the slot to engage against the inner side of the base, and the other of such end parts being narrower than the slot to enable insertion therethrough with the binding member arranged longitudinally of the slot and thus provide a holding means for the binding member which is adapted to be free of holding engagement with the base while the pin member is engaged and the intermediate part is placed about a cable, such other end part having a bend after assembly.

7. In a device for clamping cables or the like against a slotted base, binding members each comprising a strap like element adapted to embrace a cable and having lateral extensions at one end for engagement under the edges of the slot, and the opposite end of the element being narrower than the slot and retained therein by bending against the engaged end of an adjacent binding member.

HARRY L. KINDORF.